Patented Nov. 18, 1947

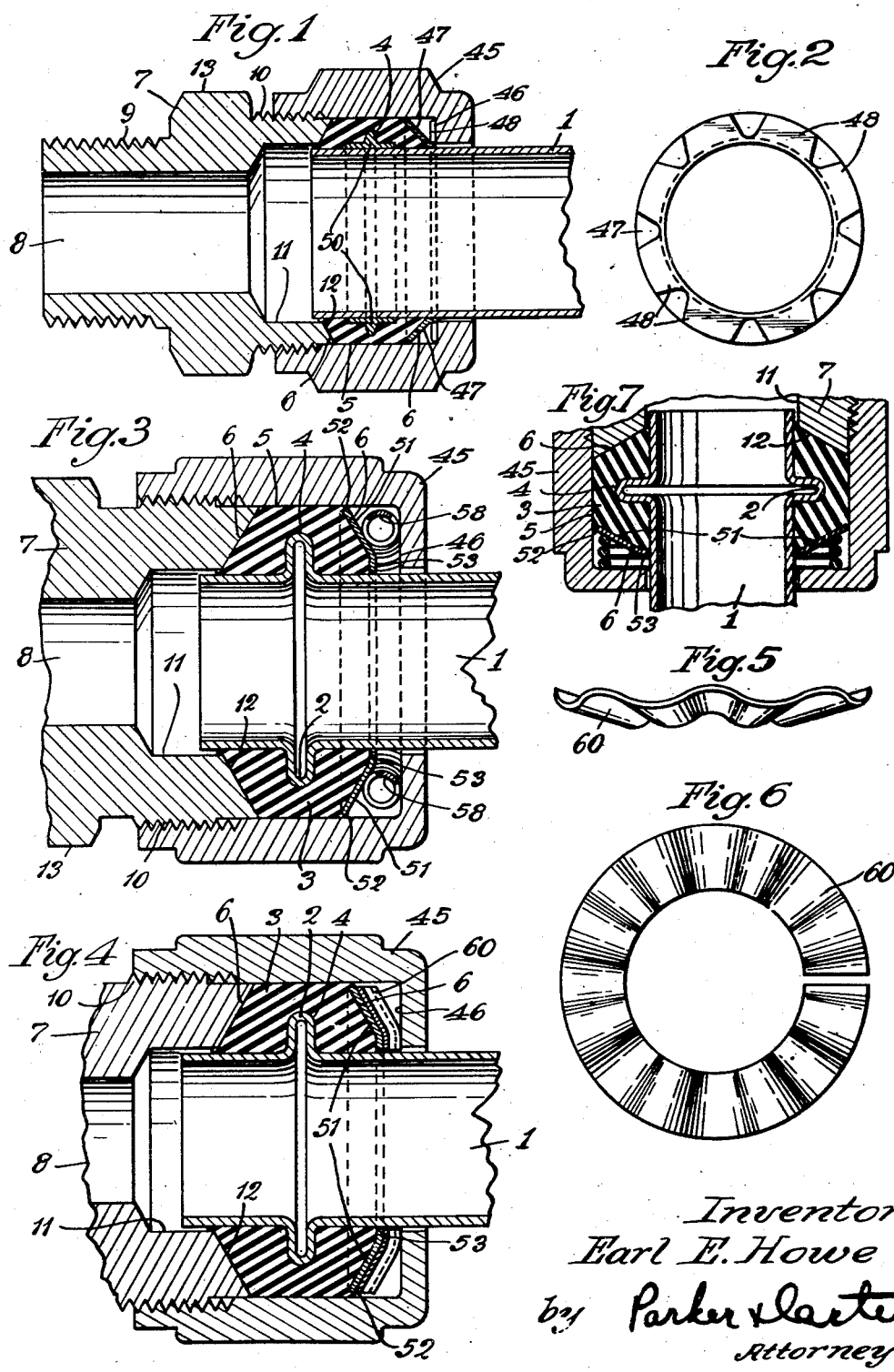

2,431,120

UNITED STATES PATENT OFFICE 2,431,120

JOINT FOR TUBING

Earl E. Howe, Chicago, Ill., assignor, by mesne assignments, to Chicago Forging and Manufacturing Company, Chicago, Ill., a corporation of Delaware Original application January 6, 1944, Serial No. 517,169. Divided and this application December 11, 1944, Serial No. 567,587

4 Claims. (Cl. 285—90)

My invention relates generally to connections for tubing or pipes having thin walls. One purpose is to provide fluid tight connection for tubing that includes an elastic compressible sealing, cushioning member.

Another purpose is to provide a joint for tubing in which direct metal to metal contacts are avoided.

Another purpose is to provide a joint for tubing which includes improved cushioning means.

Another purpose is to provide a joint for tubing of maximum simplicity.

My invention is particularly applicable to fluid tight sealing connections for tubes subjected to fluids at high pressure.

The present application is a division of my copending application Serial No. 517,169, filed on January 6, 1944, for Joints for tubing.

Other objects will appear from time to time throughout the specification and claims.

I illustrate my invention more or less diagrammatically in the accompanying drawings, wherein Figure 1 is an axial section through a joint embodying my invention;

Figure 2 is a detail of the pressure element of the joint shown in Figure 1;

Figure 3 is an axial section through a variant form;

Figure 4 is an axial section through another variant form;

Figure 5 is a side elevation of the spring member shown in Figure 4;

Figure 6 is a plan view of the spring member shown in Figure 5; and

Figure 7 is a partial axial section showing another form of my invention.

Like parts are indicated by like characters throughout the specification and drawings.

Referring to the drawings it will be understood that the joint is formed by a tube 1 preferably a somewhat thin walled tube. In the form of Figure 1 it is shown as having a ferrule 50 secured adjacent the end of the tube. In other forms the tube is provided with an outwardly extending circumferential upset 2, which forms a bead or rib or outward holding projection. Surrounding this outward projection and engaging both faces thereof and also engaging the adjacent parts of the tube is a member 3 which may be made of any suitable elastic, compressible material. I may employ for example rubber or rubber-like materials or synthetics. The member 3 is preferably preformed to have generally the form which it takes in the final joint. It may, for example, have a generally cylindrical circumferential area 5, and generally conic end surfaces 6. It also has an inner channel 4 to receive the projection 2. It will be understood, however, that the initial form of the mass may be varied to suit particular needs, and to prevent the necessity of any substantial distortion during tightening of the joint. The outward projection 2 is formed preferably adjacent one end of the tube. It may be formed by rolling the tube wall outwardly. With reference to the rest of the joint, I employ a fitting generally indicated as 7 which has a central bore 8, a reduced externally screw threaded portion 9 at one end, and an externally screw threaded portion 10, at the opposite end, of substantially greater diameter. The inner bore is enlarged within such screw threaded portion as at 11. The adjacent end of the fitting is generally conically tapered as at 12. 13 is any suitable gripping portion which may hexagonally or otherwise be formed. The interior of the enlarged bore 11 is of sufficient internal diameter to receive the end of the tube 1 without contacting it, and is of sufficient depth to avoid any contact with the end of the tube.

I employ also an outer member or nut 45 shown as terminating inwardly in a surface 46 lying in a plane perpendicular to the axes of the joint. The pressure chamber thus formed is somewhat larger than the washer or rubber member 3 and gives space for a suitable loaded spring. In the form of Figures 1 and 2 the spring includes the conic thrusting member 47, which engages the opposed conforming face of the member 3, and a plurality of integral spring fingers 48. When the member 47 is in its initial position, the fingers 48 are inclined substantially in relation to a plane perpendicular to the axis of the spring ring. When the ring is positioned on the tube 1 and is housed within the pressure chamber, and as the pressure chamber parts are screwed together to build up pressure, the fingers 48 are eventually flexed into the position in which they are shown in Figure 1, and exert a yielding thrust which forces the conic portion 47 against the opposed end of the elastic compressible mass 3. As the pressure is continued and increased by rotation of the member 45, eventually the entire space in the pressure chamber will be filled by the mass 3. The space between the fingers 48 and the conic ring 47 is not filled with material and does not form part of the pressure chamber. It will be noted that in Figure 1, I illustrate a ferrule 50 in place of the integral outward folding of the tube shown at 2 in Figure 3. Either form of projection may be employed.

In the form of Figures 3 and 4, I illustrate a generally conic thrust plate 51, which has an outer lip or outer edge 52 and an inner portion 53 lying in a plane generally perpendicular to the axis of the joint.

In the form of Figure 7, I illustrate a coil spring 54, coaxial with the joint, which exerts a pressure against the plate 51 and thus provides a spring loading for the member 3.

In the form of Figure 3, the other parts of the drawing being the same, I employ a coil spring 58, the coil of which surrounds the axis of the joint.

In the form of Figure 4, I may employ the conic thrust plate 51 but in the place of the springs illustrated in Figures 7 and 3, I employ a corrugated spring washer 60.

It will be realized that whereas I have shown and described an operative device, still many changes might be made in the size, shape, number, arrangement and disposition of parts without departing materially from the spirit of my invention. I wish, therefore, that my showing be taken as in a broad sense as diagrammatic and illustrative, rather than as a limitation to my precise showing.

The use and operation of my invention are as follows:

I have developed a joint or connection for tubes and the like which includes the following advantages:

1. An elimination of any direct contact between the tube and the surrounding fittings.

2. A joint in which an elastic compressible mass of material may be employed which can advantageously be preformed in such fashion as to require a minimum of distortion.

3. A joint in which an elastic compressible mass is subjected to a loaded spring.

The projection or bead may be shaped in various forms, some being shown herein. Some forms may be made by rolling and others by the use of dies including a central die to prevent inward collapse of the tube. Such die means are shown, for example, in my co-pending application Serial No. 486,463, filed May 10, 1943.

Seals or connections made in accordance with the present disclosure have been employed under pressures up to five thousand pounds or more per square inch, while subjected to intermittent or constant pressure and vibration. They are useful for example in connection with internal combustion engines and high pressure pumps and in the pressure systems of tanks, airplanes and naval vessels. In the forms of Figures 5 and following, I disclose a spring loading feature and illustrate various forms of spring loading which may be used in connection with an elastic compressible washer.

I claim:

1. In a high pressure joint, a tube having a circumferential outward projection adjacent an end thereof, a mass of elastic compressible sealing material surrounding said projection and the adjacent parts of the tube, a member to which said tube is connected, said member having a chamber for receiving and surrounding said sealing material, said chamber being formed by a plurality of relatively movable chamber elements, one of said elements having an aperture through which an end of the tube extends, means for moving said chamber elements toward opposite sides of the mass of sealing material thereby to place said mass under pressure, and spring loading means located within the space defined by said chamber elements and adapted, in response to movement of said chamber elements toward closed position, to exert a controllable spring loading against said mass, said spring loading means including a movable pressure member engaging one end of said mass and a corrugated spring washer interposed between said pressure element and an end of said chamber.

2. In a high pressure joint, a tube having a circumferential outward projection adjacent an end thereof, a mass of elastic compressible sealing material surrounding said projection and the adjacent parts of the tube, a member to which said tube is connected, said member having a chamber for receiving and surrounding said sealing material, said chamber being formed by a plurality of relatively movable chamber elements, one of said elements having an aperture through which an end of the tube extends, means for moving said chamber elements toward opposite sides of the mass of sealing material thereby to place said mass under pressure, and spring loading means located within the space defined by said chamber element and adapted, in response to movement of said chamber elements toward closed position, to exert a controllable spring loading against said mass, said spring loading means including a movable pressure member engaging one end of said mass and a pressure loading element between said pressure element and an end of said chamber, including a plurality of spring fingers integral with said pressure member.

3. In a pressure joint, a tube having a circumferential outward projection adjacent an end thereof, a washer of flexible material surrounding the tube and surrounding said projection, a multi-part chamber element into which said tube penetrates, said washer being located in and surrounded by said chamber element when the joint is completed, said washer constituting the sole connection between the tube and the chamber element, and means for spring loading said washer including a generally conic plate, located within said chamber element, a spring element located within said chamber element and interposed between a wall of said chamber element and the opposed conic face of said washer, and means for subjecting the washer to pressure, including means for moving one part of said chamber element in relation to another part, and for thereby urging said spring element against said plate.

4. In a pressure joint, a tube, a washer of flexible material surrounding the tube, a multi-part chamber element into which said tube penetrates, said washer being located in and surrounded by said chamber element when the joint is completed, said washer constituting the sole connection between the tube and the chamber element, and means for spring loading said washer including a generally conic plate, located within said chamber element, a spring element located within said chamber element and interposed between a wall of said chamber element and the opposed conic face of said washer, and means for subjecting the washer to pressure, including means for moving one part of said chamber element in relation to another part, and for thereby urging said spring element against said plate.

EARL E. HOWE.

(References on following page)

REFERENCES CITED

The following references are of record in the file of this patent:

UNITED STATES PATENTS

| Number | Name | Date |
|---|---|---|
| 2,344,698 | Howe | Mar. 21, 1944 |
| 2,358,408 | McMurray | Sept. 19, 1944 |
| 2,201,372 | Miller | May 21, 1940 |
| 2,212,745 | McIntosh | Aug. 27, 1940 |

FOREIGN PATENTS

| Number | Country | Date |
|---|---|---|
| 770,564 | France | July 2, 1934 |